(12) United States Patent
Zhou et al.

(10) Patent No.: US 11,581,740 B2
(45) Date of Patent: Feb. 14, 2023

(54) METHOD, SYSTEM AND STORAGE MEDIUM FOR LOAD DISPATCH OPTIMIZATION FOR RESIDENTIAL MICROGRID

(71) Applicant: Hefei University of Technology, Anhui (CN)

(72) Inventors: Kaile Zhou, Anhui (CN); Lulu Wen, Anhui (CN); Shanlin Yang, Anhui (CN)

(73) Assignee: Hefei University of Technology, Hefei (CN)

(*) Notice: Subject to any disclaimer, the term of this patent is extended or adjusted under 35 U.S.C. 154(b) by 795 days.

(21) Appl. No.: 16/537,610

(22) Filed: Aug. 11, 2019

(65) Prior Publication Data
US 2020/0161867 A1  May 21, 2020

(51) Int. Cl.
| | | |
|---|---|---|
| *G06N 3/00* | (2006.01) | |
| *G06N 3/04* | (2006.01) | |
| *G06N 3/08* | (2006.01) | |
| *G06Q 10/06* | (2012.01) | |
| *H02J 3/38* | (2006.01) | |
| *G06N 3/006* | (2023.01) | |
| *G06N 3/084* | (2023.01) | |

(Continued)

(52) U.S. Cl.
CPC ............. *H02J 3/383* (2013.01); *G06N 3/006* (2013.01); *G06N 3/0445* (2013.01); *G06N 3/0454* (2013.01); *G06N 3/084* (2013.01); *G06Q 10/06315* (2013.01); *G06Q 50/06* (2013.01); *H02J 3/003* (2020.01); *H02J 2203/20* (2020.01)

(58) Field of Classification Search
CPC ..... G06N 3/006; G06N 3/0445; G06N 3/0454
See application file for complete search history.

(56) References Cited

U.S. PATENT DOCUMENTS

| 9,817,375 B2 * | 11/2017 | Li ............................ F24F 11/30 |
| 10,290,064 B2 * | 5/2019 | Zhou ....................... G06Q 50/06 |
| 2018/0238951 A1 * | 8/2018 | Tao ........................ G06K 9/6269 |

FOREIGN PATENT DOCUMENTS

| CN | 102738834 B | 8/2014 |
| CN | 108054784 A | 5/2018 |
| CN | 108964050 A | 12/2018 |

* cited by examiner

*Primary Examiner* — Manuel A Rivera Vargas

(57) ABSTRACT

The present invention provides a method, system and storage medium for load dispatch optimization for residential microgrid. The method includes collecting environmental data and time data of residential microgrid in preset future time period; obtaining power load data of residential microgrid in future time period by inputting environmental data and time data into pre-trained load forecasting model; obtaining photovoltaic output power data of residential microgrid in future time period by inputting environmental data and time data into pre-trained photovoltaic output power forecasting model; determining objective function and corresponding constraint condition of residential microgrid in future time period, where optimization objective of objective function is to minimize total cost of residential microgrid; obtaining load dispatch scheme of residential microgrid in future time period by solving objective function with particle swarm algorithm. The invention can provide load dispatch scheme suitable for current microgrid and reduce operating cost of residential microgrid.

11 Claims, 1 Drawing Sheet

(51) Int. Cl.
*G06Q 10/0631* (2023.01)
*G06Q 50/06* (2012.01)
*H02J 3/00* (2006.01)

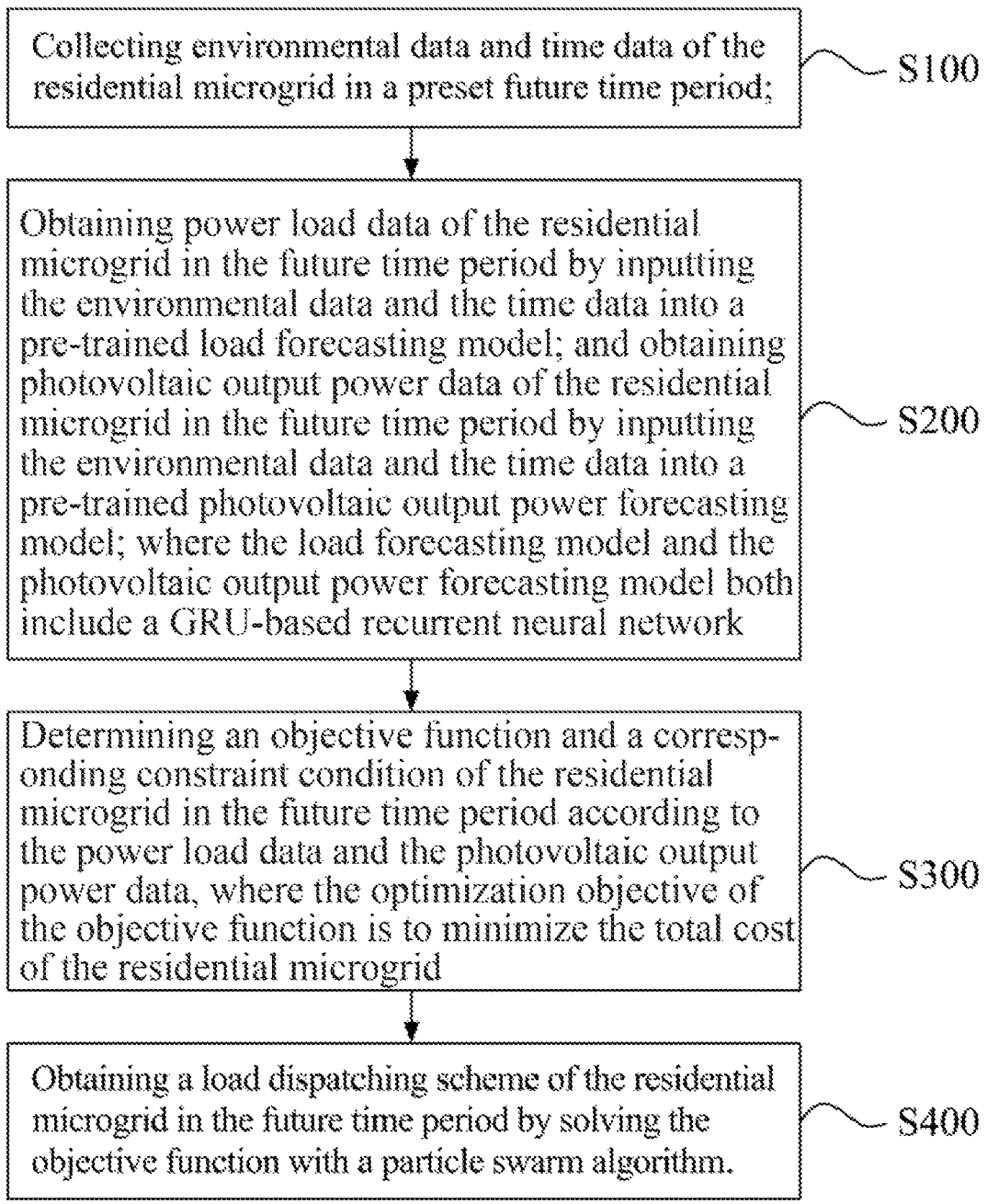

METHOD, SYSTEM AND STORAGE MEDIUM FOR LOAD DISPATCH OPTIMIZATION FOR RESIDENTIAL MICROGRID

CROSS-REFERENCE TO RELATED APPLICATIONS

This application claims the benefit of priority from Chinese Patent Application No. CN201811359740.9, filed on Nov. 15, 2018. The content of the aforementioned application, including any intervening amendments thereto, is incorporated herein by reference in its entirety.

TECHNICAL FIELD

The invention relates to the technical field of residential power load dispatch, and particularly relates to a load dispatch optimization method, system and storage medium for a residential microgrid.

BACKGROUND OF THE PRESENT INVENTION

With the rapid growth of the population and the rapid development of the economy, residential electricity consumption has increased significantly. In order to balance the supply and demand of electricity, reduce carbon emissions and costs, the development of residential microgrid and smart grid has received more and more attention. The residential microgrid is generally composed of residential load, solar energy, energy storage units and electric vehicles, where the intermittent and volatility of solar energy has a certain impact on the operation of the microgrid. At the same time, the number of smart terminals in residential buildings is increasing, and residential power load has strong volatility and randomness, which will affect the balance of supply and demand of electricity. Therefore, reliable power load forecasting and photovoltaic output power forecasting are of great significance, which contributes to the balance of power supply and demand of residential microgrid, improves the integration of renewable energy and provides a basis for load dispatch optimization of microgrid.

Power load forecasting can be mainly divided into short-term load forecasting (for example, one day), medium-term load forecasting (for example, one month), and long-term load forecasting (for example, one year). The short-term load forecasting is beneficial to maintaining the dynamic balance of supply and demand of electricity, promoting the implementation of demand response strategies and optimizing the dispatch of residential microgrid load. However, due to the randomness and volatility of residential electricity, the accuracy of the existing short-term load forecasting method is low. The photovoltaic output power forecasting method is roughly similar to the load forecasting method, but there are also problems such as low forecasting accuracy.

Because the accuracy of power load forecasting and photovoltaic output power forecasting is low, the load dispatch scheme of residential microgrid is not suitable for the current residential microgrid, which makes the operating cost of the residential microgrid relatively high.

SUMMARY OF THE PRESENT INVENTION

1. Technical Problem to be Solved

In view of the deficiencies of the prior art, the present invention provides a load dispatch optimization method, system and storage medium for a residential microgrid, and provides a load dispatch scheme suitable for the current microgrid to reduce the operating cost of the residential microgrid.

2. Technical Solution

To achieve the above object, the present invention is achieved by the following technical solutions:

In a first aspect, the present invention provides a load dispatch optimization method for a residential microgrid, which is performed by a computer, and the method includes:

S100, collecting environmental data and time data of the residential microgrid in a preset future time period;

S200, obtaining power load data of the residential microgrid in the future time period by inputting the environmental data and the time data into a pre-trained load forecasting model; and obtaining photovoltaic output power data of the residential microgrid in the future time period by inputting the environmental data and the time data into a pre-trained photovoltaic output power forecasting model; where the load forecasting model and the photovoltaic output power forecasting model both include a GRU-based recurrent neural network;

S300, determining an objective function and a corresponding constraint condition of the residential microgrid in the future time period according to the power load data and the photovoltaic output power data, where the optimization objective of the objective function is to minimize the total cost of the residential microgrid; and S400, obtaining a load dispatch scheme of the residential microgrid in the future time period by solving the objective function with a particle swarm algorithm.

In a second aspect, the present invention provides a load dispatch optimization system for a residential microgrid, the system including a computer, the computer including:

at least one storage unit;

at least one processing unit;

where at least one instruction is stored in the at least one storage unit, and the at least one instruction is loaded and executed by the at least one processing unit to perform the steps of:

S100, collecting environmental data and time data of the residential microgrid in a preset future time period;

S200, obtaining power load data of the residential microgrid in the future time period by inputting the environmental data and the time data into a pre-trained load forecasting model; and obtaining photovoltaic output power data of the residential microgrid in the future time period by inputting the environmental data and the time data into a pre-trained photovoltaic output power forecasting model; where the load forecasting model and the photovoltaic output power forecasting model both include a GRU-based recurrent neural network;

S300, determining an objective function and a corresponding constraint condition of the residential microgrid in the future time period according to the power load data and the photovoltaic output power data, where the optimization objective of the objective function is to minimize the total cost of the residential microgrid; and S400, obtaining a load dispatch scheme of the residential microgrid in the future time period by solving the objective function with a particle swarm algorithm.

In a third aspect, the present invention provides a computer readable storage medium having stored thereon a computer program, the computer program when executed by a processor can implement the above dispatch method.

3. Beneficial Effect

Embodiments of the present invention provide a method, system and storage medium for load dispatch optimization for a residential microgrid, which have the following beneficial effects.

The forecasting model in the present invention includes a GRU-based recurrent neural network (i.e., RNN), which can simulate the time dependence of the power load and the photovoltaic output power compared to a ANN, and can significantly improve the forecasting accuracy while solve problems such as gradient disappearance and gradient explosion compared to a conventional RNN. Due to the improved forecasting accuracy of the residential load and the photovoltaic output power, the optimization dispatch scheme obtained based on the residential load and the photovoltaic output power is more suitable for the current residential microgrid, which is beneficial to balance the power supply and demand in the residential microgrid, improve the integration of renewable energy and reduce operating cost and environmental pollution of the microgrid.

BRIEF DESCRIPTION OF THE DRAWINGS

In order to more clearly illustrate embodiments of the present invention or technical solutions in the prior art, drawings for describing the embodiments or the prior art will be briefly introduced below. Apparently, the drawings in the following description are mere some embodiments of the present invention, and those skilled in the art can obtain other drawings according to the drawings without any creative work.

FIG. 1 shows a schematic flow chart of a load dispatch optimization method for a residential microgrid according to an embodiment of the present invention.

DETAILED DESCRIPTION OF THE PRESENT INVENTION

In order to make the objectives, technical solutions and advantages of the embodiments of the present invention more clear, the technical solutions in the embodiments of the present invention are clearly and completely described below in conjunction with the drawings in the embodiments of the present invention. It is apparent that the described embodiments are some of the embodiments of the invention, and not all of the embodiments. All other embodiments obtained by those skilled in the art based on the embodiments of the present invention without creative efforts fall within the scope of the present invention.

In a first aspect, the present invention provides a load dispatch optimization method for a residential microgrid, which is performed by a computer. As shown in FIG. 1, the method includes:

S100, collecting environmental data and time data of the residential microgrid in a preset future time period;

It can be understood that since short-term forecasting is beneficial to maintaining dynamic balance of power supply and demand, promoting the implementation of demand response strategies and load dispatch optimization of residential microgrid, the future time period can be set to short-term, for example, in a future day.

It can be understood that for example, the environmental data can be weather conditions or the like. The weather conditions can be quantified to specific values during specific processing. The time data can be several time points in the future time period. For example, if a smart meter collects load data every half hour, there will be 48 collection time points within one day. The 48 collection time points within one day in the future time period are used as the time data.

S200, obtaining power load data of the residential microgrid in the future time period by inputting the environmental data and the time data into a pre-trained load forecasting model; and obtaining photovoltaic output power data of the residential microgrid in the future time period by inputting the environmental data and the time data into a pre-trained photovoltaic output power forecasting model; where the load forecasting model and the photovoltaic output power forecasting model both include a GRU-based recurrent neural network;

In practical applications, the training process of the load forecasting model may include the following steps:

S001a, obtaining first data in a first historical time period, each piece of the first data including residential load data, corresponding environmental data and corresponding time data;

For example, data is collected every half hour, and there are 48 first data in a day. Each of first data includes power load, current weather and current time. A total of $d_1*48$ data is obtained by continuously collecting in the past $d_1$ days.

S002a, dividing all the first data in the first historical time period into a first training set and a first test set, and performing normalization processing on the first training set and the first test set, where any time data in the first training set is earlier than any time data in the first test set;

For example, the past $d_1$ days are divided into two sub-time periods, the first training set is formed by the first ¾ first data in the $d_1*48$ first data, and the first test set is formed by the last ¼ first data. The first training set and the first test set are represented in a matrix form, respectively, a first training matrix and a first test matrix.

The first training matrix is as following:

$$\text{train} = \begin{bmatrix} p_{1,1}, p_{1,2} & L & p_{1,n} \\ L & L & L \\ p_{d_1 \times 48 \times \frac{3}{4},1}, p_{d_1 \times 48 \times \frac{3}{4},2} & L & p_{d_1 \times 48 \times \frac{3}{4},n} \end{bmatrix}$$

The first test matrix is as following:

$$\text{test} = \begin{bmatrix} p_{d_1 \times 48 \times \frac{3}{4}+1,1}, p_{d_1 \times 48 \times \frac{3}{4}+1,2} & L & p_{d_1 \times 48 \times \frac{3}{4}+1,n} \\ L & L & L \\ p_{d_1 \times 48,1}, p_{d_1 \times 48,2} & L & p_{d_1 \times 48,n} \end{bmatrix}$$

In the above matrices, each row includes power load data, environmental data and time data, and data in the same column in the matrices has the same meaning, that is, all data in the same column is the power load data, the environmental data or the time data.

S003a, setting the number of layers of GRU layers in a first recurrent neural network and the number of neurons in each GRU layer, the number of layers of hidden layers and the number of neurons in each hidden layer, and network related parameters;

Among others, the network related parameters may include a regularization parameter, a Dropout parameter, and the like. The recurrent neural network refers to RNN.

Among others, GRU is a variant of LSTM, which will have different effects when dealing with different data. GRU is called Gated Recurrent Unit.

A Dropout parameter can be set for each layer of the neural network. The Dropout parameter can be used to dynamically adjust the number of neurons in the layer network during the training process, and is the parameter used in training the neural network with Keras (a Python-based deep learning library).

S004a, inputting the first training set subjected to the normalization processing into the first recurrent neural network, and obtaining a load forecasting model by training with the Adam gradient descent algorithm;

It can be understood that the training process is the process for determining parameters in the model.

S005a, inputting the environmental data and the time data in the first test set into the current load forecasting model to obtain the forecasted load data;

S006a, obtaining a first evaluation result by evaluating forecasting capability of the current load forecasting model according to the forecasted load data and the corresponding power load data in the first test set; and determining whether the current load forecasting model satisfies a preset first forecasting accuracy requirement according to the first evaluation result, and if so, the current load forecasting model as the final load forecasting model is output; otherwise, the current load forecasting model is adjusted and the process returns to S003a.

It can be understood that the corresponding power load data in the first test set is real data, and the real data and the forecasted load data are compared to learn whether the forecasting of the current load forecasting model is accurate.

In practical applications, the root mean square error, the mean absolute error, and/or the mean absolute error percentage between the real data and the forecasted load data can be calculated. Based on the error values, the accuracy of the current load forecasting model can be learned, with the smaller the error, the higher the accuracy. So the errors can be used as the first evaluation result.

When the accuracy of the current forecasting model satisfies the requirement, the current forecasting model can be used as the final forecasting model or the objective forecasting model. Otherwise, the model parameters are required to be adjusted and the process returns to S0053 where the determining is continued until the accuracy satisfies the requirement.

Similar to the training process of the load forecasting model, the training process of the photovoltaic output power forecasting model may include the following steps:

S001b, obtaining second data in a second historical time period, each of the second data includes photovoltaic output power data, corresponding environmental data and corresponding time data;

For example, the second data is collected every five minutes, and there are 288 data in a day. Each of second data includes photovoltaic output power, weather and time point. A total of $d_2*288$ second data is obtained by continuously collecting in $d_2$ days.

S002b, dividing the second historical time period into a second training set and a second test set, and performing normalization processing on the second training set and the second test set, where any time data in the second training set is earlier than any time data in the second test set;

For example, the past $d_2$ days are divided into two sub-time periods, the second training set is formed by the first 3/4 first data in the $d_2*288$ second data, and the second test set is formed by the last 1/4 second data. The second training set and the second test set are represented in a matrix form, respectively, a second training matrix and a second test matrix.

The second training matrix is as following:

$$\text{Train}' = \begin{bmatrix} q_{1,1}, q_{1,2} & L & q_{1,n} \\ L & L & L \\ q_{d_2 \times 288 \times \frac{3}{4},1}, q_{d_2 \times 288 \times \frac{3}{4},2} & L & q_{d_2 \times 288 \times \frac{3}{4},n} \end{bmatrix}$$

The second test matrix is as following:

$$\text{Test}' = \begin{bmatrix} q_{d_2 \times 288 \times \frac{3}{4}+1,1}, q_{d_2 \times 288 \cdot \frac{3}{4}+1,2} & L & q_{d_2 \times 288 \times \frac{3}{4}+1,n} \\ L & L & L \\ q_{d_2 \times 288,1}, q_{d_2 \times 288,2} & L & q_{d_2 \times 288,n} \end{bmatrix}$$

In the above matrices, each row includes photovoltaic output power data, environmental data and time data, and data in the same column in the matrices has the same meaning, that is, all data in the same column is the photovoltaic output power data, the environmental data or the time data.

S003b setting the number of layers of GRU layers in a second recurrent neural network and the number of neurons in each GRU layer, the number of layers of hidden layers and the number of neurons in each hidden layer, and network related parameters;

Among others, the network related parameters may include a regularization parameter, a Dropout parameter, and the like. The recurrent neural network refers to RNN.

S004b, inputting the second training set subjected to the normalization processing into the second recurrent neural network, and obtaining an initial photovoltaic output power forecasting model by training with the Adam gradient descent algorithm;

It can be understood that the training process is the process for determining parameters in the model.

S005b, inputting the environmental data and the time data in the second test set into the current photovoltaic output power forecasting model to obtain the forecasted photovoltaic output power data;

S006b, obtaining a second evaluation result by evaluating forecasting capability of the current photovoltaic output power forecasting model according to the forecasted photovoltaic output power data and the corresponding photovoltaic output power data in the second test set; and determining whether the current photovoltaic output power forecasting model satisfies a preset second forecasting accuracy requirement according to the second evaluation result, and if so, the current photovoltaic output power forecasting model as the final photovoltaic output power forecasting model is output; otherwise, the current photovoltaic output power forecasting model is adjusted and the process returns to S003b.

It can be understood that the corresponding photovoltaic output power data in the second test set is real data, and the real data and the forecasted photovoltaic output power data are compared to learn whether the forecasting result of the current photovoltaic output power forecasting model is accurate.

In practical applications, the root mean square error, the mean absolute error, and/or the mean absolute error percentage between the real data and the forecasted photovoltaic output power data can be calculated. Based on the error values, the accuracy of the current load forecasting model can be learned, with the smaller the error, the higher the accuracy. So the errors can be used as the second evaluation result.

When the accuracy of the current forecasting model satisfies the requirement, the current forecasting model can be used as the final forecasting model or the objective forecasting model. Otherwise, the model parameters are required to be adjusted and the process returns to S003b until the accuracy satisfies the requirement.

When the first training set, the first test set, the second training set and the second test set are normalized, a first formula may be used for the normalization processing. The first formula includes:

$$w'_{i,j} = \frac{w_{i,j} - \min_j}{\max_j - \min_j}$$

In the formula, $w'_{i,j}$ represents the data of the i-th row and the j-th column in the matrix subjected to normalization processing, $w_{i,j}$ represents the data of the i-th row and the j-th column in the matrix before normalization processing, $\min_j$ represents the minimum value in the j-th column in the matrix before normalization processing, and $\max_j$ represents the maximum value in the j-th column in the matrix before normalization processing.

S300, determining an objective function and a corresponding constraint condition of the residential microgrid in the future time period according to the power load data and the photovoltaic output power data, where the optimization objective of the objective function is to minimize the total cost of the residential microgrid;

The forecasted photovoltaic output power represents the amount of power which can be provided by photovoltaic power generation, and the forecasted load data reflects the load demand of residents. Both of them are the constraint conditions that need to be met when optimizing the residential microgrid, and are mainly reflected in the constraint conditions of supply and demand balance of the residential microgrid as described below.

It can be understood that the cost of the residential microgrid generally includes the cost of electricity purchased and sold in residential electricity usage, the depreciation cost of electric vehicle batteries, the depreciation cost of energy storage units, and the cost to treat various pollutant emissions in the environment, or the like. So the objective function can be set to:

$$C = C_1 + C_2 + C_3 + C_4$$

In the function, C is the total cost in the residential microgrid, $C_1$ is the cost of electricity purchased and sold in the residential microgrid, $C_2$ is the depreciation cost of electric vehicle batteries in the residential microgrid, $C_3$ is the depreciation cost of energy storage units in the residential microgrid, and $C_4$ is the environment cost in the residential microgrid.

The optimization objective is to minimize the total cost of the residential microgrid, that is, to minimize the above $C_1$.

The calculation formula for the cost of electricity purchased and sold $C_1$ includes:

$$C_1 = \sum_{t=1}^{T} |P(t)| S_t$$

In the formula, P(t) represents the transmission value of amount of power between a main grid and the residential microgrid, $S_t$ represents the electricity price of time period t, and T is the future time period.

It can be understood that when $S_t > 0$, it indicates that the residential microgrid purchases electricity from the main grids; otherwise, it indicates that the resident microgrid sells electricity to the main grids.

The calculation formula for the depreciation cost of electric vehicle batteries $C_2$ includes:

$$C_2 = \sum_{i=1}^{m} \left( \frac{c_r}{E_1} \int_{t_{i1}}^{t_{i2}} |P_i^{EV}(t)| dt \right)$$

In the formula, m is the total number of electric vehicles in the residential microgrid, $C_r$ is the replacement cost of an electric vehicle battery, $E_1$ is the total charge and discharge capacity during the life cycle of the battery, $t_{i1}$ is the time for the i-th electric vehicle to access the residential microgrid, $t_{i2}$ is the time when the i-th electric vehicle leaves the residential microgrid, and $P_i^{EV}(t)$ represents the charge and discharge power of the i-th electric vehicle during the period t.

In practical applications, under consideration of the daily living habits of residents where an electric vehicle will be charged only upon the residents getting off work in the evening and all electric vehicles in the residential microgrid will be charged and discharged in an orderly manner, a charging load curve of the electric vehicles in the residential microgrid can be obtained through simulation. Then, according to relevant data in the charging load curve, the depreciation cost of electric vehicle batteries $C_2$ can be calculated using above formula.

The calculation formula for the depreciation cost of energy storage units $C_3$ includes:

$$C_2 = \sum_{i=1}^{m} \left( \frac{c_r}{E_1} \int_{t_{i1}}^{t_{i2}} |P_i^{EV}(t)| dt \right)$$

In the formula, n is the number of energy storage units in the residential microgrid, $C_s$ is the replacement cost of an energy storage unit, $E_2$ is the total charge and discharge capacity during the energy storage unit battery life cycle, $t_{j1}$ is the time at which the charge and discharge of the j-th energy storage unit starts, $t_{j2}$ is the time at which the charge and discharge of the j-th energy storage unit ends, and $p_j^{ESS}$ (t) represents the charge and discharge power of the j-th energy storage unit during the period t.

The calculation formula for the environment cost $C_4$ includes:

$$C_3 = \sum_{i=1}^{m} \left( \frac{c_s}{E_1} \int_{t_{j1}}^{t_{j2}} |P_i^{ESS}(t)| dt \right)$$

In the formula, k represents the k-th pollutant emissions, there are a total of K pollutant emissions, $C_k$ is the cost to treat the k-th pollutant, $a_k$ is the treatment coefficient of the k-th pollutant, and P is the amount of electricity purchased by the residential microgrid from the main grid.

The calculation formulas of the cost of electricity purchase and sale $C_1$ of the residential microgrid, the depreciation cost of the electric vehicle battery $C_2$ in the residential microgrid, the depreciation cost of the energy storage units $C_3$ in the residential microgrid and the environmental cost $C_4$ in the residential microgrid have been determined, so the formula for calculating the total cost can be determined, that is, the objective function is determined.

In practical applications, the constraint conditions may include at least one of: a supply and demand balance constraint condition of the residential microgrid, a charging constraint condition of electric vehicle and energy storage unit in the residential microgrid, a charge and discharge power constraint condition of electric vehicle and energy storage unit in the residential microgrids, a charge amount constraint condition of electric vehicle in the residential microgrid and a transmission power constraint condition between the residential microgrid and the main grid.

The supply and demand balance constraint condition may include:

$$P' + P_{pv} + P_{EVs} + P_{ESS} = P_{load}$$

In the formula, P' represents transmission power between the main grid and the residential microgrid, $P_{pv}$ represents output power of solar energy, $P_{EVs}$ represents output power of electric vehicles in the residential microgrid, $P_{ESS}$ represents output power of all energy storage units in the residential microgrid, and $P_{load}$ represents total load of the resident microgrid.

It can be understood that this is a constraint condition set according to the overall supply and demand balance of the residential microgrid.

The charging constraint may include:

$$SC_{1i}^{min} \leq SC_{1i} \leq SC_{1i}^{max}, SC_{2j}^{min} \leq SC_{2j} \leq SC_{2j}^{max}$$

In the formula, $SC_{1i}$ represents the amount of charge of the i-th electric vehicle in the residential microgrid, $SC_{2k}$ represents the amount of charge of the j-th energy storage unit in the residential microgrid, $SC_{1i}^{min}$ is a lower limit value of a state of charge of the i-th electric vehicle, $SC_{2j}^{min}$ is a lower limit value of a state of charge of the j-th energy storage unit, $SC_{1i}^{max}$ is a upper limit value of the state of charge of the i-th electric vehicle, and $SC_{2j}^{max}$ is a upper limit value of the state of charge of the j-th energy storage unit.

It can be understood that the above charge amount means the ratio of remaining power to the total capacity.

The charge and discharge power constraint condition may include:

$$P_{1i}^{min} \leq P_i^{EV} \leq P_{1i}^{max}, P_{2j}^{min} \leq P_j^{ESS} \leq P_{2j}^{max}$$

$P_i^{EV}$ is the charge and discharge power of the i-th electric vehicle in the residential microgrid, $P_j^{ESS}$ is the charge and discharge power of the j-th energy storage unit in the residential microgrid, is a lower limit of the charge and discharge power of the i-th electric vehicle, $P_{1i}^{min}$ is a lower limit of the charge and discharge power of the j-th energy storage unit $P_{2j}^{min}$ is a upper limit of the charge and discharge power of the i-th electric vehicle, and $P_{2j}^{max}$ is a upper limit of the charge and discharge power of the j-th energy storage unit.

The charge amount constraint condition may include:

$$SC_{t_i} \geq SC_{t_i}^{min}$$

In the formula, $SC_{t_i}$ represents amount of charge when the i-th electric vehicle in the residential microgrid leaves the residential microgrid, and $SC_{t_i}^{min}$ represents the minimum of charge required by the i-th electric vehicle traveling.

The transmission power constraint condition may include:

$$-P^{max} \leq P' \leq P^{max}$$

In the formula, P' represents the transmission power between the residential microgrid and the main grid, and $P^{max}$ represents the maximum transmission power between the residential microgrid and the main grid.

S400, obtaining a load dispatch scheme of the residential microgrid in the future time period by solving the objective function with a particle swarm algorithm.

The load dispatch scheme mainly includes: how much electricity is purchased by the microgrid from the main grid, the purchase time; how much electricity is sold by the microgrid to the main grid, the sold time; when is an electric vehicle charged and discharged, what is the charge and discharge amount; and when is an energy storage charged and discharged, what is the charge and discharge amount. The corresponding curves can be obtained by solving with a particle swarm algorithm.

It can be understood that the particle swarm algorithm, also known as the particle swarm optimization algorithm, starts from a random solution and finds the optimal solution through iteration, and evaluates the quality of the solution through fitness. The particle swarm algorithm is simpler than rules of a genetic algorithm, does not have "crossover" and "mutation" operations of the genetic algorithm, and seeks global optimality by following the current searched optimal values. This algorithm has the advantages of easy implementation, high accuracy and fast convergence.

Due to time dependence of the power load and the photovoltaic output power, the traditional artificial neural network (ANN) cannot simulate this time dependence. Recurrent Neural Network (RNN) can simulate the time dependence in time series and can significantly improve the forecasting accuracy, but it faces problems such as gradient disappearance and gradient explosion. Because the forecasting models in the present invention include the GRU based recurrent neural network (RNN), the problems of gradient disappearance and gradient explosion faced by the traditional RNN can be solved while significantly improving the forecasting accuracy.

It can be understood that the load dispatch optimization of the residential microgrid refers to rationally dispatching the load and power generation units in the residential microgrid, thereby promoting the balance of supply and demand of the microgrid, reducing operating cost of the system, and improving the integration of renewable energy. The traditional microgrid load dispatch generally considers the randomness of solar energy through robust optimization, and obviously cannot play the role of power big data. The forecasting models used in the present invention are all based on big data training, so the dispatch quality can be improved.

The present invention forecasts the residential load and the photovoltaic output power. By improving the forecasting accuracy of the residential load and the photovoltaic output power, the optimization dispatch scheme based on the residential load and the photovoltaic output power is more suitable for the current residential microgrid, which is beneficial to balance supply and demand of electricity in the residential microgrid, improve the integration of renewable energy and reduces the operating cost and environmental pollution of the microgrid.

In a second aspect, the present invention provides a load dispatch optimization system for a residential microgrid, the system including a computer, the computer including:
- at least one storage unit;
- at least one processing unit;

where at least one instruction is stored in the at least one storage unit, and the at least one instruction is loaded and executed by the at least one processing unit to perform the steps of:

S100, collecting environmental data and time data of the residential microgrid in a preset future time period;

S200, obtaining power load data of the residential microgrid in the future time period by inputting the environmental data and the time data into a pre-trained load forecasting model; and obtaining photovoltaic output power data of the residential microgrid in the future time period by inputting the environmental data and the time data into a pre-trained photovoltaic output power forecasting model; where the load forecasting model and the photovoltaic output power forecasting model both include a GRU-based recurrent neural network;

S300, determining an objective function and a corresponding constraint condition of the residential microgrid in the future time period according to the power load data and the photovoltaic output power, where the optimization objective of the objective function is to minimize the total cost of the residential microgrid; and S400, obtaining a load dispatch scheme of the residential microgrid in the future time period by solving the objective function with a particle swarm algorithm.

In a third aspect, the present invention provides a computer readable storage medium having stored thereon a computer program, the computer program when executed by a processor can implement the optimization dispatch method in the above first aspect.

It can be understood that the load dispatch optimization system provided by the second aspect and the storage medium provided by the third aspect correspond to the optimization dispatch method provided by the first aspect, and the related content interpretation, examples, specific embodiment, beneficial effects and the like thereof may refer to the corresponding part in the first aspect, which will not be repeated here.

It should be noted that, in this context, relational terms such as first and second are used merely to distinguish one entity or operation from another entity or operation, and do not necessarily require or imply that there is any such actual relationship or order between the entities or the operations. Furthermore, the term "comprises", "includes" or any other variations thereof is intended to encompass a non-exclusive inclusion, such that a process, method, article, or device that includes a plurality of elements includes not only those elements but also other elements not explicitly listed, or elements that are inherent to such a process, method, item, or device. Without more restrictions, an element that is defined by the phrase "comprising a . . . " does not exclude the presence of additional equivalent elements in the process, method, item, or device that includes the element.

The above embodiments are only used to illustrate the technical solutions of the present invention, and are not intended to be limiting; although the present invention has been described in detail with reference to the foregoing embodiments, it will be understood by those of ordinary skill in the art that the technical solutions described in the foregoing embodiments may be modified, or some of the technical features may be equivalently replaced; and the modifications or substitutions do not deviate from the spirit and scope of the technical solutions of the embodiments of the present invention.

What is claimed is:

1. A computer-implemented load dispatch optimization method for a residential microgrid, the method comprising:

S100, collecting environmental data and time data of the residential microgrid in a preset future time period;

S200, obtaining power load data of the residential microgrid in the future time period by inputting the environmental data and the time data into a pre-trained load forecasting model; and obtaining photovoltaic output power data of the residential microgrid in the future time period by inputting the environmental data and the time data into a pre-trained photovoltaic output power forecasting model; wherein the load forecasting model and the photovoltaic output power forecasting model both comprise a gated recurrent unit (GRU)-based recurrent neural network;

S300, determining an objective function and a constraint condition of the residential microgrid in the future time period according to the power load data and the photovoltaic output power data, wherein an optimization objective of the objective function is to minimize a total cost of the residential microgrid; and S400, obtaining a load dispatch scheme of the residential microgrid in the future time period by solving the objective function with a particle swarm algorithm.

2. The method according to claim 1, wherein
a training process of the load forecasting model comprises:

S001a, obtaining first data in a first historical time period, each piece of the first data including residential load data, corresponding environmental data and corresponding time data;

S002a, dividing all the first data in the first historical time period into a first training set and a first test set, and performing normalization processing on the first training set and the first test set, wherein any time data in the first training set is earlier than any time data in the first test set;

S003a, setting the number of layers of gated recurrent unit (GRU) layers in a first recurrent neural network and the number of neurons in each GRU layer, the number of layers of hidden layers and the number of neurons in each hidden layer, and network related parameters;

S004a, inputting the first training set subjected to the normalization processing into the first recurrent neural network, and obtaining a load forecasting model by training with the Adam gradient descent algorithm;

S005a, inputting the environmental data and the time data in the first test set into the current load forecasting model to obtain the forecasted load data; and S006a, obtaining a first evaluation result by evaluating forecasting capability of the current load forecasting model according to the forecasted load data and the corresponding power load data in the first test set; and determining whether the current load forecasting model satisfies a preset first forecasting accuracy requirement according to the first evaluation result, and if so, the current load forecasting model as the final load forecasting model is output; otherwise, the current load forecasting model is adjusted and the process returns to S003a; and/or a training process of the photovoltaic output power forecasting model comprises:

S001b, obtaining second data in a second historical time period, each of the second data includes photovoltaic output power data, corresponding environmental data and corresponding time data;

S002b, dividing the second historical time period into a second training set and a second test set, and performing normalization processing on the second training set and the second test set, wherein any time data in the second training set is earlier than any time data in the second test set;

S003b, setting the number of layers of gated recurrent unit (GRU) layers in a second recurrent neural network and the number of neurons in each GRU layer, the number of layers of hidden layers and the number of neurons in each hidden layer, and network related parameters;

S004b, inputting the second training set subjected to the normalization processing into the second recurrent neural network, and obtaining a photovoltaic output power forecasting model by training with the Adam gradient descent algorithm;

S005b, inputting the environmental data and the time data in the second test set into the current photovoltaic output power forecasting model to obtain the forecasted photovoltaic output power data; and S006b, obtaining a second evaluation result by evaluating forecasting capability of the current photovoltaic output power forecasting model according to the forecasted photovoltaic output power data and the corresponding photovoltaic output power data in the second test set; and determining whether the current photovoltaic output power forecasting model satisfies a preset second forecasting accuracy requirement according to the second evaluation result, and if so, the current photovoltaic output power forecasting model as the final photovoltaic output power forecasting model is output; otherwise, the current photovoltaic output power forecasting model is adjusted and the process returns to S003b.

3. The method according to claim 2, wherein the first training set and the first test set are represented in a matrix form, wherein each row in the matrix includes power load data, environmental data and time data, and data in the same column in the matrix has the same meaning; the second training set and the second test set are represented in a matrix form, wherein each row in the matrix includes photovoltaic output power data, environmental data and time data, and data in the same column in the matrices has the same meaning;

correspondingly, the first training set, the first test set, the second training set and the second test set are normalized with a first formula which comprises:

$$w'_{i,j} = \frac{w_{i,j} - min_j}{max_j - min_j}$$

wherein $w'_{i,j}$ represents the data of the i-th row and the j-th column in the matrix subjected to normalization processing, $w_{i,j}$ represents the data of the i-th row and the j-th column in the matrix before normalization processing, $min_j$ represents the minimum value in the j-th column in the matrix before normalization processing, and $max_j$ represents the maximum value in the j-th column in the matrix before normalization processing.

4. The method according to claim 3, wherein the objective function comprises:

$$C = C_1 + C_2 + C_3 + C_4$$

wherein C is the total cost in the residential microgrid, $C_1$ is the cost of electricity purchased and sold in the residential microgrid, $C_2$ is the depreciation cost of electric vehicle batteries in the residential microgrid, $C_3$ is the depreciation cost of energy storage units in the residential microgrid, and $C_4$ is the environment cost in the residential microgrid;

wherein the calculation formula for the cost of electricity purchased and sold comprises:

$$C_1 = \sum_{t=1}^{T} |P(t)| S_t$$

wherein P(t) represents the transmission value of amount of power between a main grid and the residential microgrid, $S_t$ represents the electricity price of time period t, and T is the future time period;

the calculation formula for the depreciation cost of electric vehicle batteries comprises:

$$C_2 = \sum_{i=1}^{m} \left( \frac{c_r}{E_1} \int_{t_{i1}}^{t_{i2}} |P_i^{EV}(t)| dt \right)$$

wherein m is the total number of electric vehicles in the residential microgrid, $C_r$ is the replacement cost of an electric vehicle battery, $E_1$ is the total charge and discharge capacity during the life cycle of the battery, $t_{i1}$ is the time for the i-th electric vehicle to access the residential microgrid, $t_{i2}$ is the time when the i-th electric vehicle leaves the residential microgrid, and $P_i^{EV}(t)$ represents the charge and discharge power of the i-th electric vehicle during the period t the calculation formula for the depreciation cost of energy storage units comprises:

$$C_3 = \sum_{j=1}^{n} \left( \frac{c_s}{E_2} \int_{t_{j1}}^{t_{j2}} |P_j^{ESS}(t)| dt \right)$$

wherein n is the number of energy storage units in the residential microgrid, Cs is the replacement cost of an energy storage unit, $E_2$ is the total charge and discharge capacity during the energy storage unit battery life cycle, $t_{j1}$ is the time at which the charge and discharge of the j-th energy storage unit starts, $t_{j2}$ is the time at which the charge and discharge of the j-th energy storage unit ends, and $P_j^{ESS}(t)$ represents the charge and discharge power of the j-th energy storage unit during the period t;

the calculation formula for the environment cost comprises:

$$C_4 = \sum_{k=1}^{K} (c_k \alpha_k) P$$

wherein k represents the k-th pollutant emissions, there are a total of K pollutant emissions, $C_k$ is the cost to treat the k-th pollutant, $\alpha_k$ is the treatment coefficient of the k-th pollutant, and P is the amount of electricity purchased by the residential microgrid from the main grid.

5. The method according to claim 4, wherein the constraint condition comprises at least one of: a supply and demand balance constraint condition of the residential microgrid, a charging constraint condition of electric vehicle and energy storage unit in the residential microgrid, a charge and discharge power constraint condition of electric vehicle and energy storage unit in the residential microgrids, a charge amount constraint condition of electric vehicle in the residential microgrid and a transmission power constraint condition between the residential microgrid and the main grid; wherein:

the supply and demand balance constraint condition comprises:

$$P' + P_{pv} + P_{EVs} + P_{ESS} = P_{load}$$

wherein P' represents transmission power between the main grid and the residential microgrid, $P_{pv}$ represents output power of solar energy, $P_{EVs}$ represents output power of electric vehicles in the residential microgrid, $P_{ESS}$ represents output power of all energy storage units in the residential microgrid, and $P_{load}$ represents total load of the resident microgrid;

the charging constraint comprises:

$$SC_{1i}^{min} \leq SC_{1i} \leq SC_{1i}^{max}, SC_{2j}^{min} \leq SC_{2j} \leq SC_{2j}^{max}$$

wherein $sc_{1i}$, represents amount of charge of the i-th electric vehicle in the residential microgrid, $SC_{2j}$, represents amount of charge of the j-th energy storage unit in the residential microgrid, $SC_{1i}^{min}$ is a lower limit value of a state of charge of the i-th electric vehicle, $SC_{2j}^{min}$ is a lower limit value of a state of charge of the j-th energy storage unit, $SC_{1i}^{max}$ is a upper limit value of the state of charge of the i-th electric vehicle, and $SC_{2j}^{max}$ is a upper limit value of the state of charge of the j-th energy storage unit;

the charge and discharge power constraint condition comprises:

$$P_{1i}^{min} \leq P_i^{EV} \leq P_{1i}^{max}, P_{2j}^{min} \leq P_j^{ESS} \leq P_{2j}^{max}$$

$P_i^{EV}$ is the charge and discharge power of the i-th electric vehicle in the residential microgrid, $P_j^{ESS}$ is the charge and discharge power of the j-th energy storage unit in the residential microgrid, $P_{1i}^{min}$ is a lower limit of the charge and discharge power of the i-th electric vehicle, $P_{2j}^{min}$ is a lower limit of the charge and discharge power of the j-th energy storage unit, $P_{1j}^{max}$ is a upper limit of the charge and discharge power of the i-th electric vehicle, and $P_{2j}^{max}$ is a upper limit of the charge and discharge power of the j-th energy storage unit;

the charge amount constraint condition comprises:

$$SC_{t_i \geq SC t_i^{min}}$$

wherein $Sc_{t_j}$ represents amount of charge when the i-th electric vehicle in the residential microgrid leaves the residential microgrid, and $SC_{t_j}^{min}$ represents the minimum of charge required by the i-th electric vehicle traveling;

the transmission power constraint condition comprises:

$$-P^{max} \leq P' \leq P^{max}$$

wherein P' represents the transmission power between the residential microgrid and the main grid, and $P^{max}$ represents the maximum transmission power between the residential microgrid and the main grid.

6. The method according to claim 2, wherein the objective function comprises:

$$C = C_1 + C_2 + C_3 + C_4$$

wherein C is the total cost in the residential microgrid, $C_1$ is the cost of electricity purchased and sold in the residential microgrid, $C_2$ is the depreciation cost of electric vehicle batteries in the residential microgrid, $C_3$ is the depreciation cost of energy storage units in the residential microgrid, and $C_4$ is the environment cost in the residential microgrid;

wherein the calculation formula for the cost of electricity purchased and sold comprises:

$$C_1 = \sum_{t=1}^{T} |P(t)| S_t$$

wherein P(t) represents the transmission value of amount of power between a main grid and the residential microgrid, $S_t$ represents the electricity price of time period t, and T is the future time period;

the calculation formula for the depreciation cost of electric vehicle batteries comprises:

$$C_2 = \sum_{i=1}^{m} \left( \frac{c_r}{E_1} \int_{t_{i1}}^{t_{i2}} |P_i^{EV}(t)| dt \right)$$

wherein m is the total number of electric vehicles in the residential microgrid, $C_r$ is the replacement cost of an electric vehicle battery, $E_1$ is the total charge and discharge capacity during the life cycle of the battery, $t_{j1}$ is the time for the i-th electric vehicle to access the residential microgrid, $t_{j2}$ is the time when the i-th electric vehicle leaves the residential microgrid, and $P_i^{EV}(t)$ represents the charge and discharge power of the i-th electric vehicle during the period t the calculation formula for the depreciation cost of energy storage units comprises:

$$C_3 = \sum_{j=1}^{n} \left( \frac{c_s}{E_2} \int_{t_{j1}}^{t_{j2}} |P_j^{ESS}(t)| dt \right)$$

wherein n is the number of energy storage units in the residential microgrid, $C_s$ is the replacement cost of an energy storage unit, $E_2$ is the total charge and discharge capacity during the energy storage unit battery life cycle, $t_{j1}$ is the time at which the charge and discharge of the j-th energy storage unit starts, $t_{j2}$ is the time at which the charge and discharge of the j-th energy storage unit ends, and $P_j^{ESS}(t)$ represents the charge and discharge power of the j-th energy storage unit during the period t;

the calculation formula for the environment cost comprises:

$$C_4 = \sum_{k=1}^{K}(c_k \alpha_k)P$$

wherein k represents the k-th pollutant emissions, there are a total of K pollutant emissions, $C_k$ is the cost to treat the k-th pollutant, $\alpha_k$ is the treatment coefficient of the k-th pollutant, and P is the amount of electricity purchased by the residential microgrid from the main grid.

7. The method according to claim 6, wherein the constraint condition comprises at least one of: a supply and demand balance constraint condition of the residential microgrid, a charging constraint condition of electric vehicle and energy storage unit in the residential microgrid, a charge and discharge power constraint condition of electric vehicle and energy storage unit in the residential microgrids, a charge amount constraint condition of electric vehicle in the residential microgrid and a transmission power constraint condition between the residential microgrid and the main grid; wherein:

the supply and demand balance constraint condition comprises:

$$P'+P_{pv}+P_{EVs}+P_{ESS}=P_{load}$$

wherein P' represents transmission power between the main grid and the residential microgrid, $P_{pv}$ represents output power of solar energy, $P_{Evs}$ represents output power of electric vehicles in the residential microgrid, $P_{ESS}$ represents output power of all energy storage units in the residential microgrid, and $P_{load}$ represents total load of the resident microgrid;

the charging constraint comprises:

$$SC_{1i}^{min} \leq SC_{1i} \leq SC_{1i}^{max}, SC_{2j}^{min} \leq SC_{2j} \leq SC_{2j}^{max}$$

wherein $SC_{1i}$, represents amount of charge of the i-th electric vehicle in the residential microgrid, $SC_{2j}$, represents amount of charge of the j-th energy storage unit in the residential microgrid, $SC_{1i}^{min}$ is a lower limit value of a state of charge of the i-th electric vehicle, $SC_{2j}^{min}$ is a lower limit value of a state of charge of the j-th energy storage unit, $SC_{1i}^{max}$ is a upper limit value of the state of charge of the i-th electric vehicle, and $SC_{2j}^{max}$ is a upper limit value of the state of charge of the j-th energy storage unit;

the charge and discharge power constraint condition comprises:

$$P_{1i}^{min} \leq P_i^{EV} \leq P_{1i}^{max}, P_{2j}^{min} \leq P_j^{ESS} \leq P_{2j}^{max}$$

$P_i^{EV}$ is the charge and discharge power of the i-th electric vehicle in the residential microgrid, $P_j^{ESS}$ is the charge and discharge power of the j-th energy storage unit in the residential microgrid, $P_{1i}^{min}$ is a lower limit of the charge and discharge power of the i-th electric vehicle, $P_{2j}^{min}$ is a lower limit of the charge and discharge power of the j-th energy storage unit, $P_{1j}^{max}$ is a upper limit of the charge and discharge power of the i-th electric vehicle, and $P_{2j}^{max}$ is a upper limit of the charge and discharge power of the j-th energy storage unit;

the charge amount constraint condition comprises:

$$SC_{t_i} \geq SC_{t_i}^{min}$$

wherein $SC_{t_i}$ represents amount of charge when the i-th electric vehicle in the residential microgrid leaves the residential microgrid, and $SC_{t_i}^{min}$ represents the minimum of charge required by the i-th electric vehicle traveling;

the transmission power constraint condition comprises:

$$-P^{max} \leq P' \leq P^{max}$$

wherein P' represents the transmission power between the residential microgrid and the main grid, and $P^{max}$ represents the maximum transmission power between the residential microgrid and the main grid.

8. The method according to claim 1, wherein the objective function comprises:

$$C=C_1+C_2+C_3+C_4$$

wherein C is the total cost in the residential microgrid, $C_1$ is the cost of electricity purchased and sold in the residential microgrid, $C_2$ is the depreciation cost of electric vehicle batteries in the residential microgrid, $C_3$ is the depreciation cost of energy storage units in the residential microgrid, and $C_4$ is the environment cost in the residential microgrid;

wherein the calculation formula for the cost of electricity purchased and sold comprises:

wherein P(t) represents the transmission value of amount of power between a main grid and the residential microgrid, $S_t$ represents the electricity price of time period t, and T is the future time period;

the calculation formula for the depreciation cost of electric vehicle batteries comprises:

$$C_2 = \sum_{i=1}^{m}\left(\frac{c_r}{E_1}\int_{t_{j1}}^{t_{j2}}|P_i^{EV}(t)|dt\right)$$

wherein m is the total number of electric vehicles in the residential microgrid, $C_r$ is the replacement cost of an electric vehicle battery, $E_1$ is the total charge and discharge capacity during the life cycle of the battery, $t_{j1}$ is the time for the i-th electric vehicle to access the residential microgrid, $t_{j2}$ is the time when the i-th electric vehicle leaves the residential microgrid, and $P_j^{ESS}(t)$ represents the charge and discharge power of the i-th electric vehicle during the period t;

the calculation formula for the depreciation cost of energy storage units comprises:

$$C_3 = \sum_{j=1}^{n}\left(\frac{c_s}{E_2}\int_{t_{j1}}^{t_{j2}}|P_j^{ESS}(t)|dt\right)$$

wherein n is the number of energy storage units in the residential microgrid, $C_s$ is the replacement cost of an energy storage unit, $E_2$ is the total charge and discharge capacity during the energy storage unit battery life cycle, $t_{j1}$ is the time at which the charge and discharge of the j-th energy storage unit starts, $t_{j2}$ is the time at which the charge and discharge of the j-th energy storage unit ends, and $P_j^{ESS}(t)$ represents the charge and discharge power of the j-th energy storage unit during the period t;

the calculation formula for the environment cost comprises:

$$C_4 = \sum_{k=1}^{K}(c_k \alpha_k)P$$

wherein k represents the k-th pollutant emissions, there are a total of K pollutant emissions, $C_k$ is the cost to treat the k-th pollutant, $\alpha_k$ is the treatment coefficient of the k-th pollutant, and P is the amount of electricity purchased by the residential microgrid from the main grid.

9. The method according to claim 8, wherein the constraint condition comprises at least one of: a supply and demand balance constraint condition of the residential microgrid, a charging constraint condition of electric vehicle and energy storage unit in the residential microgrid, a charge and discharge power constraint condition of electric vehicle and energy storage unit in the residential microgrids, a charge amount constraint condition of electric vehicle in the residential microgrid and a transmission power constraint condition between the residential microgrid and the main grid; wherein:

the supply and demand balance constraint condition comprises:

$$P' + P_{pv} + P_{EVs} + P_{ESS} = P_{load}$$

wherein P' represents transmission power between the main grid and the residential microgrid, $P_{pv}$ represents output power of solar energy, $P_{EVs}$ represents output power of electric vehicles in the residential microgrid, $P_{ESS}$ represents output power of all energy storage units in the residential microgrid, and $P_{load}$ represents total load of the resident microgrid;

the charging constraint comprises:

$$SC_{1i}^{min} \leq SC_{1i} \leq SC_{1i}^{max}, SC_{2j}^{min} \leq SC_{2j} \leq SC_{2j}^{max}$$

wherein $SC_{1i}$, represents amount of charge of the i-th electric vehicle in the residential microgrid, $SC_{2j}$, represents amount of charge of the j-th energy storage unit in the residential microgrid, $SC_{1i}^{min}$ is a lower limit value of a state of charge of the i-th electric vehicle, $SC_{2j}^{min}$ is a lower limit value of a state of charge of the j-th energy storage unit, $SC_{1i}^{max}$ is a upper limit value of the state of charge of the i-th electric vehicle, and $SC_{2j}^{max}$ is a upper limit value of the state of charge of the j-th energy storage unit;

the charge and discharge power constraint condition comprises:

$$P_{1i}^{min} \leq P_i^{EV} \leq P_{1i}^{max}, P_{2j}^{min} \leq P_j^{ESS} \leq P_{2j}^{max}$$

$p_i^{EV}$ is the charge and discharge power of the i-th electric vehicle in the residential microgrid, $P_j^{ESS}$ is the charge and discharge power of the j-th energy storage unit in the residential microgrid, $P_{1i}^{min}$ is a lower limit of the charge and discharge power of the i-th electric vehicle, $P_{2j}^{min}$ is a lower limit of the charge and discharge power of the j-th energy storage unit, $P_{1i}^{max}$ is a upper limit of the charge and discharge power of the i-th electric vehicle, and $P_{2j}^{max}$ is a upper limit of the charge and discharge power of the j-th energy storage unit;

the charge amount constraint condition comprises:

$$SC_{t_i} \geq SC_{t_i}^{min}$$

wherein $SC_{t_i}$, represents amount of charge when the i-th electric vehicle in the residential microgrid leaves the residential microgrid, and $SC_{t_i}^{min}$ represents the minimum of charge required by the i-th electric vehicle traveling;

the transmission power constraint condition comprises:

$$-P^{max} \leq P' \leq P^{max}$$

wherein P' represents the transmission power between the residential microgrid and the main grid, and $P^{max}$ represents the maximum transmission power between the residential microgrid and the main grid.

10. A computer readable storage medium having stored thereon a computer program, the computer program when executed by a processor implementing the method according to claim 1.

11. A load dispatch optimization system for a residential microgrid, the system comprising a computer;

wherein the computer comprises:

at least one storage unit; and at least one processing unit;

wherein at least one instruction is stored in the at least one storage unit, and the at least one instruction is loaded and executed by the at least one processing unit to perform steps of:

S100, collecting environmental data and time data of the residential microgrid in a preset future time period;

S200, obtaining power load data of the residential microgrid in the future time period by inputting the environmental data and the time data into a pre-trained load forecasting model; and obtaining photovoltaic output power data of the residential microgrid in the future time period by inputting the environmental data and the time data into a pre-trained photovoltaic output power forecasting model; wherein the load forecasting model and the photovoltaic output power forecasting model both comprise a GRU-based recurrent neural network;

S300, determining an objective function and a constraint condition of the residential microgrid in the future time period according to the power load data and the photovoltaic output power data, wherein the optimization objective of the objective function is to minimize the total cost of the residential microgrid; and S400, obtaining a load dispatch scheme of the residential microgrid in the future time period by solving the objective function with a particle swarm algorithm.

* * * * *